(12) United States Patent
Cosby et al.

(10) Patent No.: US 11,625,678 B2
(45) Date of Patent: Apr. 11, 2023

(54) MOBILE AND STATIONARY CAMERAS FOR IDENTIFYING A STORAGE LOCATION OF AN INVENTORY ITEM

(71) Applicant: Lenovo Enterprise Solutions (Singapore) Pte. Ltd., Singapore (SG)

(72) Inventors: David W. Cosby, Raleigh, NC (US); Jian Li, Chapel Hill, NC (US); Gary D. Cudak, Raleigh, NC (US)

(*) Notice: Subject to any disclaimer, the term of this patent is extended or adjusted under 35 U.S.C. 154(b) by 181 days.

(21) Appl. No.: 17/219,324

(22) Filed: Mar. 31, 2021

(65) Prior Publication Data
US 2022/0318723 A1 Oct. 6, 2022

(51) Int. Cl.
| | |
|---|---|
| *G06Q 10/08* | (2023.01) |
| *G06V 20/52* | (2022.01) |
| *B66F 9/075* | (2006.01) |
| *G06K 7/14* | (2006.01) |
| *G06Q 10/087* | (2023.01) |

(52) U.S. Cl.
CPC ......... *G06Q 10/087* (2013.01); *B66F 9/0755* (2013.01); *G06K 7/1417* (2013.01); *G06V 20/52* (2022.01)

(58) Field of Classification Search
CPC .. G06Q 10/087; G06K 7/1417; B66F 9/0755; G06V 20/52
See application file for complete search history.

(56) References Cited

U.S. PATENT DOCUMENTS

| | | | |
|---|---|---|---|
| 2002/0059121 A1* | 5/2002 | Schneider | G06Q 10/08 705/28 |
| 2014/0277691 A1* | 9/2014 | Jacobus | G05D 1/0274 700/216 |
| 2017/0283171 A1* | 10/2017 | High | B65G 1/0492 |

* cited by examiner

*Primary Examiner* — Paul Danneman
(74) *Attorney, Agent, or Firm* — Jeffrey Streets; Streets LawFirm

(57) ABSTRACT

A system, method and computer program product provide inventory tracking and management. The operations may include analyzing images captured by a mobile camera secured to a forklift operating within a warehouse to identify that the forklift has performed a first loading event, analyzing images captured by a stationary camera that is located in a receiving area of the warehouse to identify the forklift and identify an inventory item that is loaded on the forklift moving from the receiving area to a storage area of the warehouse, and analyzing images captured by the mobile camera secured to the forklift to identify that the forklift has performed a first unloading event and identify a storage location within the storage area associated with the first unloading event. The operations may further include storing an entry in an inventory database to indicate the identified inventory item is stored in the identified storage location.

20 Claims, 6 Drawing Sheets

MOBILE AND STATIONARY CAMERAS FOR IDENTIFYING A STORAGE LOCATION OF AN INVENTORY ITEM

BACKGROUND

The present disclosure relates to inventory tracking systems.

Background of the Related Art

Inventory refers to an amount of items, such as goods to be sold or supplies to be used, that a particular entity or facility has at any particular point in time. Over time, some items may be received and placed into inventory and other items may be taken and removed from inventory. These processes occur on a regular or periodic basis depending on the flow of activity for the entity or facility. A method or system for keeping up with all these changes may be referred to as an inventory management system.

However, in addition to simply identifying the content of the inventory at any point in time, some systems may attempt to further identify the exact location of each item within the inventory. In a large warehouse, space utilization is commonly increased through the use of rack shelving organized into rows with spaces therebetween forming aisles for access to the rows. The rack shelving may have adequate strength and dimensions, for example, to support palletized loads of items at various levels. Accordingly, the location of a particular item may include a section identifier, an aisle identifier, a rack identifier, a row identifier, and/or a specific bin or bay identifier. Any number of identifiers reflecting any of a wide variety of warehouse layouts and designs may be necessary.

The organization of inventory that is chosen to optimize efficient placement, storage and picking may vary from one entity to another entity based on the nature of the items, the required frequency of access to each item, and many other variables. However, regardless of the exact organization chosen for a particular inventory, it is important to have accurate records identifying each specific item and where that specific item is located. Much time can be wasted trying to locate an item within a large warehouse if the inventory tracking system does not keep an accurate record. Manual inventory systems are prone to mistakes and automated inventory systems can be expensive, complex and inflexible.

BRIEF SUMMARY

Some embodiments provide a computer program product comprising a non-volatile computer readable medium and non-transitory program instructions embodied therein, the program instructions being configured to be executable by a processor to cause the processor to perform various operations. The operations may include analyzing images captured by a mobile camera secured to a forklift operating within a warehouse to identify that the forklift has performed a first loading event, analyzing images captured by a stationary camera that is located in a receiving area of the warehouse to identify the forklift and identify an inventory item that is loaded on the forklift moving from the receiving area to a storage area of the warehouse, and analyzing images captured by the mobile camera secured to the forklift to identify that the forklift has performed a first unloading event and identify a storage location within the storage area associated with the first unloading event. The operations may further include storing an entry in an inventory database to indicate the identified inventory item is stored in the identified storage location.

Some embodiments provide a method including analyzing images captured by a mobile camera secured to a forklift operating within a warehouse to identify that the forklift has performed a first loading event, analyzing images captured by a stationary camera that is located in a receiving area of the warehouse to identify the forklift and identify an inventory item that is loaded on the forklift moving from the receiving area to a storage area of the warehouse, and analyzing images captured by the mobile camera secured to the forklift to identify that the forklift has performed a first unloading event and identify a storage location within the storage area associated with the first unloading event. The method may further include storing an entry in an inventory database to indicate the identified inventory item is stored in the identified storage location.

Some embodiments provide a system including a wireless mobile camera for capturing images, a stationary camera for capturing images, and a computing system. The computing system may include at least one non-volatile storage device storing program instructions, and at least one processor configured to process the program instructions, wherein the program instructions are configured to, when processed by the at least one processor, cause the computing system to perform various operations. The operations may include analyzing images captured by a mobile camera secured to a forklift operating within a warehouse to identify that the forklift has performed a first loading event, analyzing images captured by a stationary camera that is located in a receiving area of the warehouse to identify the forklift and identify an inventory item that is loaded on the forklift moving from the receiving area to a storage area of the warehouse, and analyzing images captured by the mobile camera secured to the forklift to identify that the forklift has performed a first unloading event and identify a storage location within the storage area associated with the first unloading event. The operation may further include storing an entry in an inventory database to indicate the identified inventory item is stored in the identified storage location.

DETAILED DESCRIPTION

Figure 1:
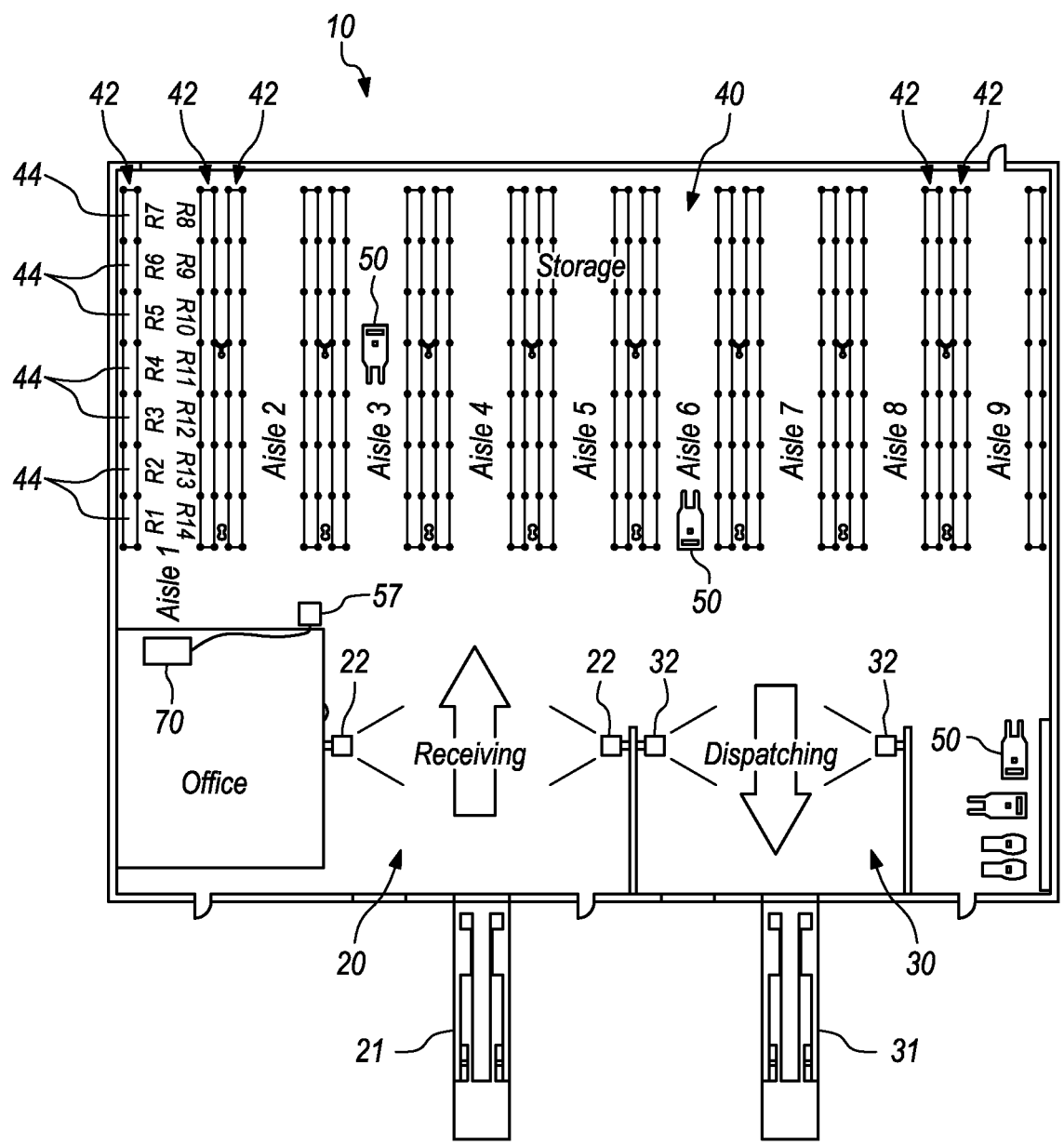
FIG. 1 is a plan view of a warehouse including a designated receiving area, a designated storage area and a designated dispatching area.

Some embodiments provide a computer program product comprising a non-volatile computer readable medium and non-transitory program instructions embodied therein, the program instructions being configured to be executable by a processor to cause the processor to perform various operations. The operations may include analyzing images captured by a mobile camera secured to a forklift operating within a warehouse to identify that the forklift has performed a first loading event, analyzing images captured by a stationary camera that is located in a receiving area of the warehouse to identify the forklift and identify an inventory item that is loaded on the forklift moving from the receiving area to a storage area of the warehouse, and analyzing images captured by the mobile camera secured to the forklift to identify that the forklift has performed a first unloading event and identify a storage location within the storage area associated with the first unloading event. The operations may further include storing an entry in an inventory database to indicate the identified inventory item is stored in the identified storage location.

The term "warehouse" is used broadly to refer to any space or facility where products, goods, supplies and/or other inventory items are inventoried. The warehouse includes a receiving area for incoming inventory items and/or a dispatching area for outgoing inventory items. The receiving area and/or dispatching area may be dedicated areas for only incoming and outgoing inventory items, respectively, or a single area my serve as both a receiving and dispatching area. The warehouse may also include a storage area that is established for storage of the inventory items. The storage area may have a layout that allows the forklift to access any of a plurality of designated storage locations, whether those storage locations are at a floor level, on shelving, stacked or some other storage arrangement. However, each storage location may have some type of storage identifier that is in view of a mobile camera secured to the forklift.

In some embodiments, the mobile and stationary cameras are digital cameras that capture digital images. Such digital cameras may capture images at one or more frequency and/or capture images as a continuous video stream. In one option, the mobile camera may capture still or video images in response to some event, such as raising or lowering of the forks of the forklift. In another option, the stationary camera may capture still or video images in response to some event, such as detecting motion in the are where the stationary camera is mounted. The mobile camera is preferably wireless so that it can transmit captured images in real-time as the forklift transports inventory items about the warehouse. The stationary camera may be wired or wireless. Embodiments may analyze images captured by one or more stationary camera in a warehouse receiving area and/or a warehouse dispatching area. Optionally, a warehouse having multiple receiving areas and/or dispatching areas may have one or more stationary cameras in each receiving area and/or dispatching area.

The forklift is a powered vehicle that is used to lift and move materials over short distances, such as within a warehouse. As used herein, the term forklift in intended to encompass manually driven and operated vehicles as well as autonomous guided vehicles (AGVs) and autonomous mobile robots (AMRs). However, the forklift should have the functionality to lift/load an inventory item, transport the inventory item, and place/unload the inventory item.

The mobile camera is secured to the forklift, such as being mounted to a cab, mast or other structure of the forklift. Optionally, the mobile camera may be secured to the forklift with an intermediate arm or bracket in order to position and orient the camera(s) to view the storage location identifiers and/or the inventory item. By securing the mobile camera to the forklift, the mobile camera may be used to identify loading events and unloading events at any location within the warehouse where the forklift may pickup or deliver an inventory item, including the receiving area, the storage area, the dispatching area, or any other location within the warehouse. Accordingly, embodiments may provide the technical advantage of providing full coverage of activity throughout the warehouse without the complexity and expense of installing a vast matrix of stationary cameras throughout the entire storage area of the warehouse. Embodiments may also require less processing to monitor and interpret the camera feeds, since the number of cameras is kept low. Furthermore, it is a technical advantage that even if unplanned circumstances result in the forklift temporarily setting an inventory item in an undesignated area other than the storage area, such unloading event may still be identified via captured images from the mobile camera.

The stationary camera may be located in a receiving area and/or a dispatching area of the warehouse to identify the forklift and identify an inventory item that is loaded on the forklift. Accordingly, the stationary camera, either alone or in combination with other stationary cameras in the same area, may be positioned to have a clear view of one or more side of the inventory item and/or the forklift as the forklift and inventory item moves into or out of the area to a storage area of the warehouse. The inventory item is expected to have identifying markings, such as a product or model name, product or model number, stock keeping unit (SKU) code, or barcode that is displayed on one or more side of the inventory item. To maximize the likelihood of capturing an image of the identifying markings regardless of their location and orientation on the inventory item, a plurality of stationary cameras may be used at various positions and/or orientations within the receiving area and/or dispatching area.

In some embodiments, images captured by a mobile camera secured to a forklift operating within a warehouse may be analyzed to identify that the forklift has performed a first loading event. The first loading event may be identified by analyzing the images captured by the mobile camera to determine that the forklift is moving and the inventory item is moving along with the forklift. In other words, two or more sequential images may indicate that objects or images surrounding the forklift have moved within the field of view of the mobile camera while the inventory item has not moved within the field of view of the mobile camera. This indicates that the inventory item is moving along with the forklift. Optionally, the first loading event may be identified as the point in time when the inventory item initially begins to move as a unit with the movement of the forklift. From the perspective of the images captured by the camera, the first loading event may be identified as the point in time when the inventory item remains in the same position within the camera's field of view and the surroundings of the forklift securing the camera are changing their position within the camera's field of view.

In some embodiments, images captured by a mobile camera secured to a forklift operating within a warehouse may be analyzed to identify that the forklift has performed a first unloading event. The first unloading event may be identified by analyzing the images captured by the mobile camera to determine that the forklift is moving and the inventory item is no longer moving along with the forklift. In other words, two or more sequential images may indicate that objects or images surrounding the forklift have moved within the field of view of the mobile camera and that the inventory item has also moved within the field of view of the mobile camera. This indicates that the inventory item is no longer moving along with the forklift. Optionally, the first unloading event may be identified as the point in time when the inventory item is no longer moving as a unit with the movement of the forklift. From the perspective of the images captured by the camera, the first unloading event may be identified as the point in time when the inventory item no longer remains in the same position within the camera's field of view and the surroundings of the forklift securing the camera are changing their position within the camera's field of view.

In some embodiments, the operations may further include storing, in response to identifying the inventory item that is loaded on the forklift, a temporary association between the identified inventory item and the identified forklift. The association between the identified inventory item and the identified forklift is only temporary since the inventory item will subsequently be delivered to, and unloaded in, a storage location. The temporary association between the identified inventory item and the identified forklift facilitates a subsequent association between the identified inventory item and a storage location where the identified forklift performs its next unloading event. So, the inventory tracking or management system may initially associate the identified inventory item with the identified forklift, then subsequently associate the identified forklift with an identified storage location. Subsequent to the identified forklift performing an unloading event at the identified storage location, the inventory tracking or management system may then apply a transitive relationship to form an association between the identified inventory item (most recently loaded item by the identified forklift) and the identify storage location (the location where the identified forklift performed a subsequent unloading event). Accordingly, the temporary association between the identified inventory item and the identified forklift is no longer needed and may be deleted or marked in a history log as no longer being current.

In some embodiments, the images captured by the stationary and mobile cameras and provided to the inventory tracking or management system are analyzed to identify the inventory item, the forklift, loading events, unloading events, and storage locations. Optionally, the images captured by the stationary camera(s) may be used exclusively to identify an inventory item and a forklift that are to be temporarily associated as a result of the inventory item being loaded on the forklift. The stationary camera(s) may have a better position or angle for capturing images suitable for identifying this information. In particular, identifying indicia of the inventory item may not consistently be within a field of view of a mobile camera that is secured to the forklift. However, the images captured by the forklift may be analyzed to identify loading events, unloading events, and storage locations. Furthermore, a given mobile camera may be uniquely associated with, and assigned to, a single forklift to which the given mobile camera is physically secured. So, every image captured by a given camera may be associated with the forklift to which it is physically secured and logically assigned. Loading events, unloading events and storage location identifiers identified by analyzing images captured by, and received from, the given mobile camera may be automatically associated with the forklift to which the mobile camera is secured and assigned.

In some embodiments, the warehouse may have multiple forklifts, multiple inventory items, and multiple storage locations. Each of the forklifts, inventory items and storage locations may have unique identifying indicia that is clearly displayed for image capture, such as a number, code, and/or symbol. The type of identifying indicia may vary between the forklifts, inventory items and storage locations. In one option, any one or more of the forklifts, inventory items and storage locations may be identified by analyzing a captured image of a barcode displayed thereon. As used herein, the term "barcode" includes both linear (one-dimensional) barcodes and two-dimensional barcodes. Of course, even linear barcodes are displayed on a two-dimensional surface and have a height and width. However, the terminology of a one-dimensional or two-dimensional barcode refers to whether the data is represented in one or two dimensions. For example, a barcode that has a plurality of parallel lines with varying widths and spacings is a one-dimensional barcode. By contrast, a barcode that has rectangles, dots, hexagons and other patterns uniquely arranged over a two-dimensional area is a two-dimensional barcode. Either type of barcode may uniquely identify each of the forklifts, inventory items and storage locations. For the inventory items, the barcodes may optionally encode a universal product code (UPC), which may presently be a standardized twelve-digit code, or may optionally encode a stock keeping unit (SKU), which may presently be a company-specific alpha-numeric code.

In some embodiments, the storage location is identified by the mobile camera capturing an image of a location identifier displayed at the storage location in the view of the mobile camera at a time associated with the identified first unloading event. The location identifier could be displayed on the floor or a wall of the storage area, on a shelf or upright of a rack, or on a hanging sign. A time may be considered to be associated with an unloading event if the time is within a range of time just before, during or after an unloading event. Specifically, the mobile camera may capture an image of a location identifier as the forklift approaches the storage location, during the unloading of the inventory item, or as the forklift is leaving the storage location. However, in each of these alternatives, the location identifier present in a captured image having a timestamp that is closest in time to the unloading event may be considered to be the storage location where the inventory item was unloaded.

In some embodiments, images captured by the stationary camera that is located in the receiving area of the warehouse may be analyzed in response to identifying the first loading event to determine that the identified forklift is currently located in the receiving area of the warehouse. A loading event in the receiving area may indicate that an inventory item is about to be added to the inventory.

In some embodiments, the operations and methodologies described for identifying a storage location of an inventory item may also be applied for identifying that an inventory item has been removed from the storage location and/or removed from the inventory. In such embodiments, the loading event may occur at a storage location and a subsequent unloading event may occur in a dispatching area of the warehouse. Specifically, the operations of the inventory tracking or management system may further include analyzing images captured by the mobile camera secured to the forklift to identify that the forklift has performed a second loading event and identify the storage location within the warehouse associated with the second loading event, analyzing images captured by a stationary camera that is located in a dispatching area of the warehouse to identify the forklift and identify the inventory item that is loaded on the forklift entering the dispatching area of the warehouse, and analyzing images captured by the mobile camera secured to the forklift to identify that the forklift has performed a second unloading event. The manner of identifying the storage location, loading event and unloading event may include any of the methodologies described for other embodiments. The operations may further include updating the inventory database to indicate that the identified inventory item is no longer stored in the identified storage location. Optionally, the operations may still further include analyzing, in response to identifying the second unloading event, images captured by the stationary camera that is located in the dispatching area of the warehouse to determine that the identified forklift is currently located in the dispatching area of the warehouse. Timestamps associated with captured images from the mobile and stationary cameras may be used to determine the chronology of events and/or to match information identified by one camera with information identified by another camera.

In some embodiments, the operations may further include analyzing images captured by the mobile camera secured to the forklift to identify that the forklift has performed a second loading event and identify the storage location within the warehouse associated with the second loading event, analyzing images captured by a stationary camera that is located in a dispatching area of the warehouse to identify the forklift entering the dispatching area of the warehouse, analyzing images captured by the mobile camera secured to the forklift to identify that the forklift has performed a second unloading event, and updating the inventory database to indicate that the inventory item previously indicated to be stored in the identified storage location is no longer stored in the identified storage location. Optionally, the operations may still further include analyzing, in response to identifying the second unloading event, images captured by the stationary camera that is located in the dispatching area of the warehouse to determine that the identified forklift is currently located in the dispatching area of the warehouse.

Some embodiments provide a method including analyzing images captured by a mobile camera secured to a forklift operating within a warehouse to identify that the forklift has performed a first loading event, analyzing images captured by a stationary camera that is located in a receiving area of the warehouse to identify the forklift and identify an inventory item that is loaded on the forklift moving from the receiving area to a storage area of the warehouse, and analyzing images captured by the mobile camera secured to the forklift to identify that the forklift has performed a first unloading event and identify a storage location within the storage area associated with the first unloading event. The method may further include storing an entry in an inventory database to indicate the identified inventory item is stored in the identified storage location. The foregoing method may further include any one or more aspects or operations of the computer program product described herein.

In some embodiments, the method may include the use of an artificial intelligence (AI) inference engine. The AI inference engine may apply logical rules to the captured images, the identified objects in the captured images and the inventory database.

Some embodiments provide a system including a wireless mobile camera for capturing images, a stationary camera for capturing images, and a computing system. The computing system may include at least one non-volatile storage device storing program instructions, and at least one processor configured to process the program instructions, wherein the program instructions are configured to, when processed by the at least one processor, cause the computing system to perform various operations. The operations may include analyzing images captured by a mobile camera secured to a forklift operating within a warehouse to identify that the forklift has performed a first loading event, analyzing images captured by a stationary camera that is located in a receiving area of the warehouse to identify the forklift and identify an inventory item that is loaded on the forklift moving from the receiving area to a storage area of the warehouse, and analyzing images captured by the mobile camera secured to the forklift to identify that the forklift has performed a first unloading event and identify a storage location within the storage area associated with the first unloading event. The operation may further include storing an entry in an inventory database to indicate the identified inventory item is stored in the identified storage location. The foregoing system may further include any one or more aspects or operations of the computer program product or method described herein, as well as any of the components or structures described herein.

In some embodiments, the system may further include a mobile computing device. The mobile computing device may be secured to the forklift and may be in wired or wireless communication with one or more mobile camera that is also secured to the forklift. Images captured by the cameras may be sent directly to a main computing system that runs the inventory tracking and management application and/or the captured images may be sent to the mobile computing device. Accordingly, the mobile computing device may do any portion of the processing described herein. Beneficially, the mobile computing device may receive the captured images more quickly than they can be transferred to the main computing system. In one option, the mobile computing device may perform image analysis, such as reading barcodes and/or identifying loading events and unloading events, such that the amount of data transmitted wirelessly to the main computing system is substantially reduced. Specifically, the captured images may be processed by the mobile computing device and then the mobile computing device may transmit the detecting barcode information and an indicator that a loading event or unloading event has occurred. In large warehouse environments with numerous forklifts constantly moving inventory in and out of the warehouse, performing the image analysis locally on a mobile computing device for each forklift will substantially reduce wireless network traffic as well as the image processing load on the main computing device. Furthermore, the mobile computing device may perform an AI inference engine to assist with image identification, event detection and inventory tracking.

FIG. 1 is a plan view of a warehouse 10 including a designated receiving area 20, a designated dispatching area 30 and a designated storage area 40. In general, new inventory items may be delivered to the receiving area 20 by a delivery truck 21, loaded onto a forklift 50, and taken for storage in the storage area 40. Accordingly, an inventory tracking or management application should update an inventory database to reflect the new inventory items and their location within the warehouse 10. At some other time, an existing inventory item may be taken from the storage area 40 by a forklift 50, and unloaded in the dispatching area 30 for removal from the warehouse 10 in the dispatch truck 31. Accordingly, an inventory tracking or management application should update the inventory database to reflect that the existing inventory items are no longer in the warehouse. It should be appreciated that other scenarios may involve similar changes to an inventory database. For example, if the inventory database tracks supplies for a manufacturing process, the inventory items may be removed from the storage area to a manufacturing area where the items are consumed in the fabrication of a product.

In the embodiments shown, the receiving area 20 includes two stationary cameras 22 having a field of view illustrated by diverging lines. The stationary cameras 22 are installed in the receiving area 20 for detecting and identifying a forklift and an inventory item. Should the inventory item have a barcode applied on only one side of the inventory item, then having multiple stationary cameras with different positions, orientations or viewing angles will improve the likelihood of the barcode being in the field of view of one of the receiving area cameras 22. Similarly, the stationary cameras 22 may capture images of a forklift 50, such as by a number, code or barcode on a side of the forklift, as the forklift passes through the receiving area 20. These captured images are subsequently provided to an inventory tracking or management application.

Similarly, the dispatching area 30 includes two stationary cameras 32 having a field of view illustrated by diverging lines. The stationary cameras 32 are installed in the dispatching area 30 for detecting and identifying a forklift 50 and an inventory item. Should the inventory item have a barcode applied on only one side of the inventory item, then having multiple stationary cameras with different positions, orientations or viewing angles will improve the likelihood of the barcode being in the field of view of one of the dispatching area cameras 22. Similarly, the stationary cameras 32 may identify a forklift 50, such as by a number, code or barcode on a side of the forklift, as the forklift passes through the dispatching area 30.

The mobile cameras are secured to the forklifts 50 that move around within the warehouse 10. The forklifts 50 and mobile cameras are discussed below in reference to FIG. 3. However, the forklifts 50 are able to move between areas and down aisles to load and unload inventory items into the storage area 40, such as on the rows 42 of racks 44. As shown, Aisle 1 has racks on either side of the aisle with the racks labeled R1-R14.

A computing system 70 may also be located in a warehouse office or other location, including a remote datacenter or cloud computing environment accessible over the Internet. As shown, the computing system 70 is connected to a wireless receiver 57 for wireless communication with any of the receiving area cameras 22, dispatching area cameras 32, and or wireless devices on the forklifts 50.

Figure 2:
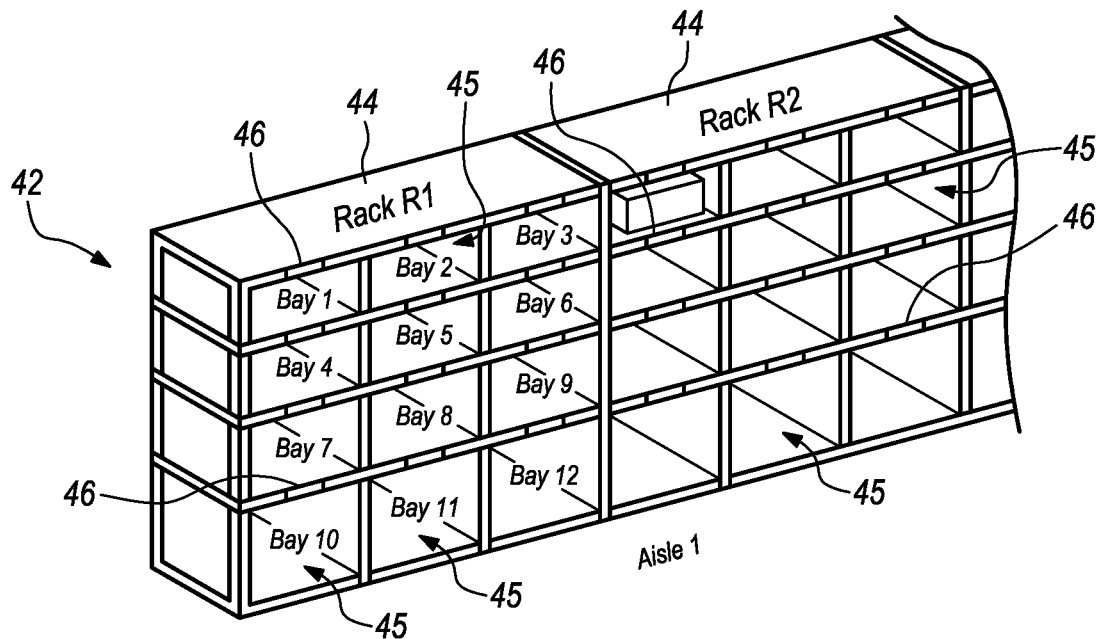
FIG. 2 is a perspective view of a row of storage racks having numerous storage locations and a storage location identifier at each of the storage locations.

FIG. 2 is a perspective view of a partial row 42 of storage racks 44 having numerous storage locations 45 (Bays 1-12) in each rack 44 and a storage location identifier 46 above each of the storage locations 45. This is a non-limiting example of a suitable organization of storage locations 45 for palletized inventory items, but many other organizations may be envisioned consistent with the various embodiments.

Figure 3:
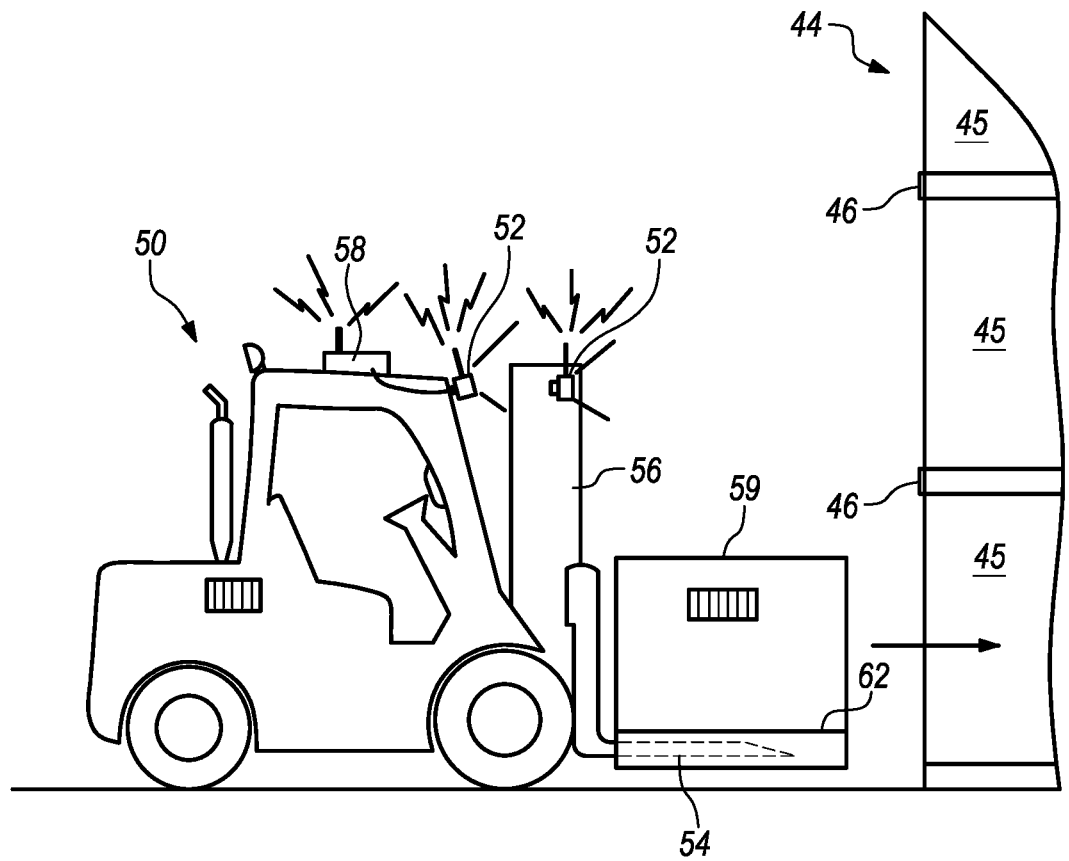
FIG. 3 is a side view of a forklift have a wireless mobile camera for identifying a storage location identifier and identifying loading and unloading events.

FIG. 3 is a side view of a forklift 50 have a wireless mobile camera 52 for identifying a storage location identifier and identifying loading and unloading events. In fact, there are two wireless cameras 52 illustrating that one or more cameras may be secured in various positions as necessary to capture images of the storage location identifiers 46 and the inventory item 59. Accordingly, the mobile camera 52 is preferably forward-facing (i.e., directed forward with respect to the forklift 50). The images captured by the mobile camera 52 may be wirelessly transmitted to a wireless receiver (not shown) within the warehouse and provided to a computer running an inventory tracking or management application.

This particular forklift 50 is driven by an operator (person not shown) and may load and unload the inventory item 59 using the forks 54. The forks 54 may, for example, extend into a pallet 62 upon which the inventory item 59 rests. As necessary, the operator of the forklift 50 may raise and lower the forks 54 along a mast 56 to load and unload the inventory item 59 and to lift the inventory item 59 to a height necessary to place the inventory item 59 in one of the storage locations 45. As the inventory item 59 is positioned into a storage location 45, the mobile camera 52 may capture an image of the storage location identifier 46 displayed on the front of the storage location. As previously described, the image of the storage location identifier 46 is analyzed by the inventory tracking or management application to identify the storage location and then associate the inventory item 59 with the storage location where the inventory item has been unloaded.

The forklift 50 also has an optional mobile computing device 58 that is in wired communication with one of the cameras 52 and in wireless communication with another of the cameras 52. Images captured by either or both of the cameras 52 may be sent directly to a main computing system 70 (see FIG. 1) that runs the inventory tracking and management application and/or the captured images may be sent to the mobile computing device. Accordingly, the mobile computing device may do any portion of the processing described herein. Beneficially, the mobile computing device may receive the captured images more quickly than they can be transferred to the main computing system. In one option, the mobile computing device may perform image analysis, such as reading barcodes and/or identifying loading events and unloading events, such that the amount of data transmitted wirelessly to the main computing system is substantially reduced. Specifically, the captured images may be processed by the mobile computing device and then the mobile computing device may transmit the detecting barcode information and an indicator that a loading event or unloading event has occurred. In large warehouse environments with numerous forklifts constantly moving inventory in and out of the warehouse, performing the image analysis locally on a mobile computing device for each forklift will substantially reduce wireless network traffic as well as the image processing load on the main computing device. Furthermore, the mobile computing device may perform an AI inference engine to assist with image identification, event detection and inventory tracking.

Figure 4:
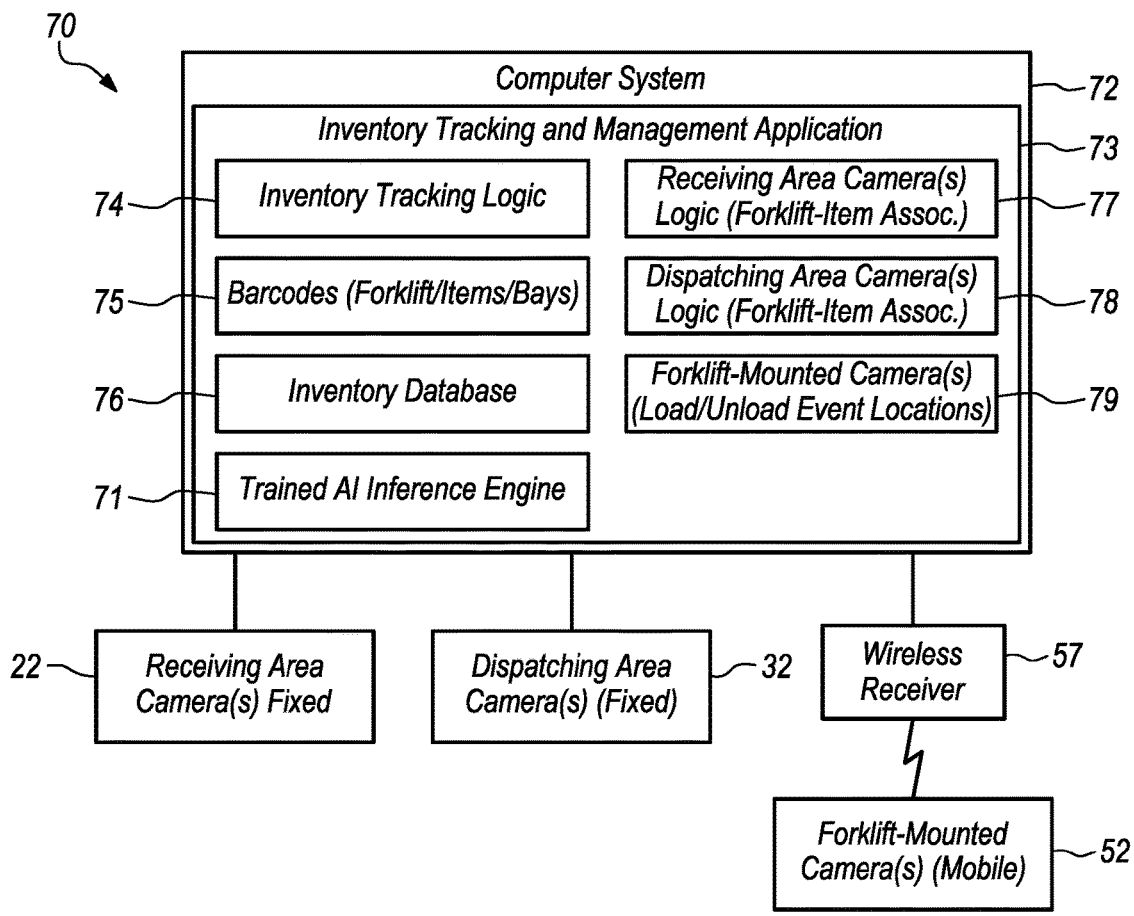
FIG. 4 is a block diagram of a system for identifying the storage location of an inventory item.

FIG. 4 is a block diagram of a system 70 for tracking and/or identifying the storage location of an inventory item. The system 70 includes a computing system 72 that runs an inventory tracking and management application 73. The inventory tracking and management application 73 may include various modules that perform certain operations of the application. The operations of the application 73 may be organized in various manners other than that shown, but this example illustrates an inventory tracking logic module 74, a barcodes module 75 (i.e., for the forklifts, inventory items and storage locations), an inventory database 76, receiving area camera logic module 77, dispatching area camera logic module 78 and forklift-mounting mobile camera logic module 79. The inventory tracking logic module 74 may track the location of each inventory item, such as an inventory item that is actively being moved by a forklift. The barcodes module 75 may store codes associated with each of the forklifts, inventory items and storage locations within the warehouse. The inventory database 76 may store a listing of each inventory item and its associated storage location within the warehouse. The receiving area camera logic module 77 may receive the captured images from the stationary cameras 22 in the receiving area 20 and make various identifications, determinations and associations. The dispatching area camera logic 78 may similarly receive the captured images from the stationary cameras 32 in the dispatching area 30 and make various identifications, determinations and associations. The forklift-mounting mobile camera logic 79 may receive captured images from the mobile camera 52 and make various identifications, determinations and associations. In one example, the receiving area camera logic module 77, the dispatching area camera logic module 78 and forklift-mounting mobile camera logic module 79, as well as the barcodes module 75 may provide input to the inventory tracking logic module 74. The inventory tracking logic module 74 may make various determinations and store updates to the inventory database 76. An optional trained AI inference engine 71 may also be provided. For example, the AI inference engine may apply logical rules to the captured images, the identified objects in the captured images and the inventory database.

The computing system 72 is in communication with the receiving area camera(s) 22, the dispatching area camera(s) 32, and the wireless receiver 57 that picks up wireless transmissions from the forklift-mounted mobile camera(s) 52. Accordingly, the inventory tracking and management application 73 may receive the captured images from each of the cameras 22, 32, 52 and may analyze the images to identify loading events, unloading events, and identifiers of forklifts, inventory items and storage locations.

Figure 5:
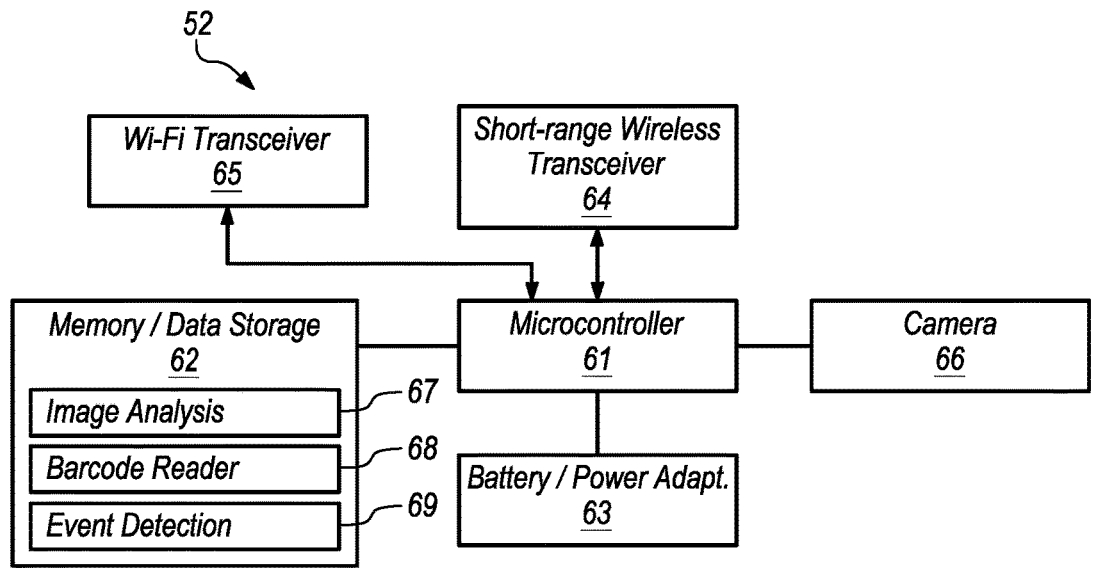
FIG. 5 is a block diagram of a wireless camera.

FIG. 5 is a diagram of a mobile camera 52. The mobile camera 52 may include a microcontroller/processor 61, memory 62, a battery 63 or other power source, a short-range wireless transceiver 64 (perhaps Bluetooth), a Wi-Fi transceiver 65, and a camera 66. The battery/power source 63 provides power to each of the other components and may allow the mobile camera 52 to be mobile. The microcontroller/processor 61 may access the memory 62 to read and/or write data and/or read program instructions, and may control use of the short-range wireless transceiver 64, the Wi-Fi transceiver 65, and the camera 66. Optionally, the memory 62 may include an image analysis program 67 including program instructions that may be executed by the microcontroller 61 to cause the performance of various operations. The memory 62 may also store a barcode reader program 68 and/or event detection logic 69. Accordingly, the mobile camera 52 may be suitable for use on a forklift without the assistance of an on-board mobile computer.

Figure 6:
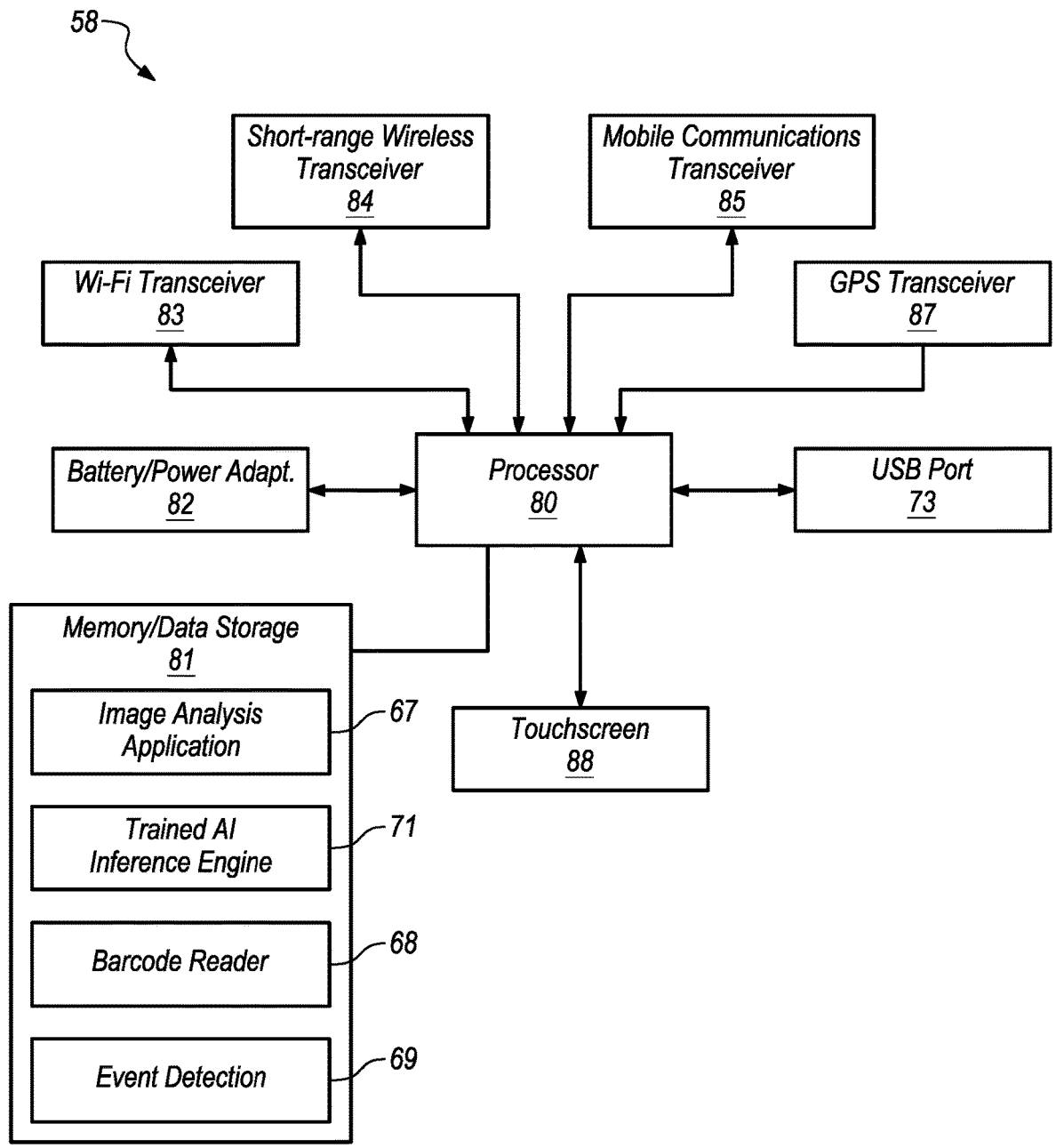
FIG. 6 is a block diagram of a mobile computing system.

FIG. 6 is a diagram of a mobile computer 58. The mobile computer 58 may include a processor 80, memory or data storage device 81, a battery (or other power source) 82, a universal serial bus (USB) port 83. The mobile computer 58 may further include a touchscreen 88, short-range wireless transceiver 84, a wireless local area network transceiver ("Wi-Fi transceiver") 83, a mobile communication transceiver 85 for communication with a cellular communication network, and a global positioning system (GPS) transceiver 87. Accordingly, the Wi-Fi transceiver 83 enables the formation of a wireless local area network connection with the wireless receiver 57 of FIGS. 1 and 4 as well as with a wireless camera 52 of FIG. 3.

The memory 81 may store one or more applications including program instructions that are executable by the processor 80. Such applications may include an operating system and applications that may perform various operations of the embodiments described herein. For example, the memory 81 may include an image analysis application or program 67, a trained AI inference engine 71, a barcode reader 68, and/or an event detection module 69. Captured images, events, barcodes and other information may be transmitted to the main computing system via the Wi-Fi transceiver 83 or other wireless means.

Figure 7:
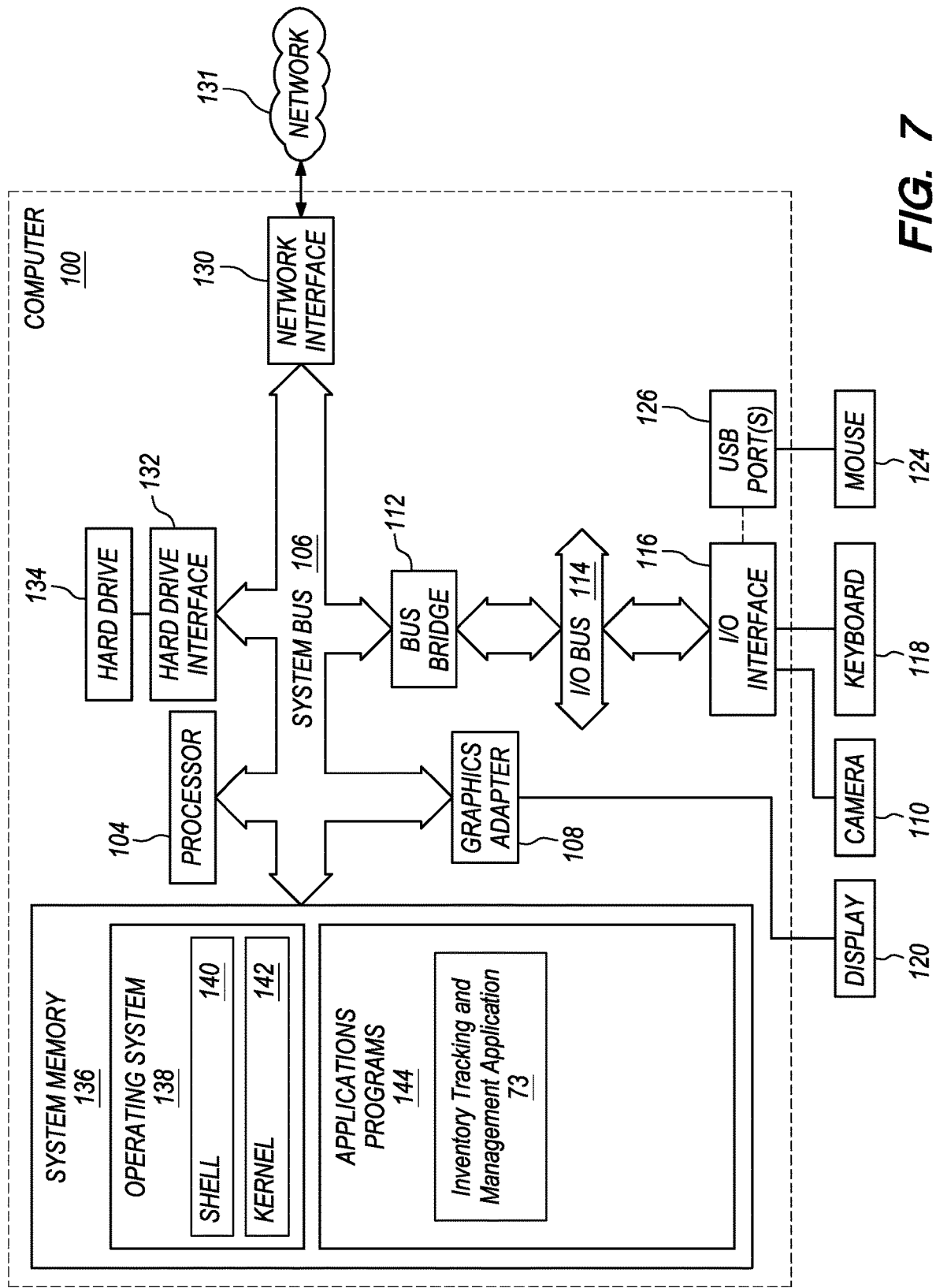
FIG. 7 is block diagram of a computer that may perform various operations in accordance with some embodiments.

FIG. 7 is block diagram of a computer 100 that may be representative of the computing system 72 of FIG. 4 for performing various operations in accordance with some embodiments. The computer 100 includes a processor unit 104 that is coupled to a system bus 106. The processor unit 104 may utilize one or more processors, each of which has one or more processor cores. A graphics adapter 108, which drives/supports the display 120, is also coupled to system bus 106. The graphics adapter 108 may, for example, include a graphics processing unit (GPU). The system bus 106 is coupled via a bus bridge 112 to an input/output (I/O) bus 114. An I/O interface 116 is coupled to the I/O bus 114. The I/O interface 116 affords communication with various I/O devices, including a camera 110, a keyboard 118 (such as a touch screen virtual keyboard), and a USB mouse 124 via USB port(s) 126 (or other type of pointing device, such as a trackpad). As depicted, the computer 100 is able to communicate with other network devices over the network 131 using a network adapter or network interface controller 130.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as a lowest level of volatile memory in the computer 100. This volatile memory may include additional higher levels of volatile memory (not shown), including, but not limited to, cache memory, registers and buffers. Data that populates the system memory 136 may include an operating system (OS) 138 and application programs 144. Embodiments may include application programs that include the program instructions for the inventory tracking and management application 73 that causes the processor 104 to perform the operations according to one or more embodiments.

The operating system 138 for the computer 100 may include a shell 140 for providing transparent user access to resources such as the application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 140 may be a text-based, line-oriented user interface, embodiments may support other user interface modes, such as graphical, voice, gestural, etc.

As depicted, the operating system 138 also includes the kernel 142, which may include lower levels of functionality for the operating system 138, including providing essential services required by other parts of the operating system 138 and application programs 144. Such essential services may include memory management, process and task management, disk management, and mouse and keyboard management.

Figure 8:
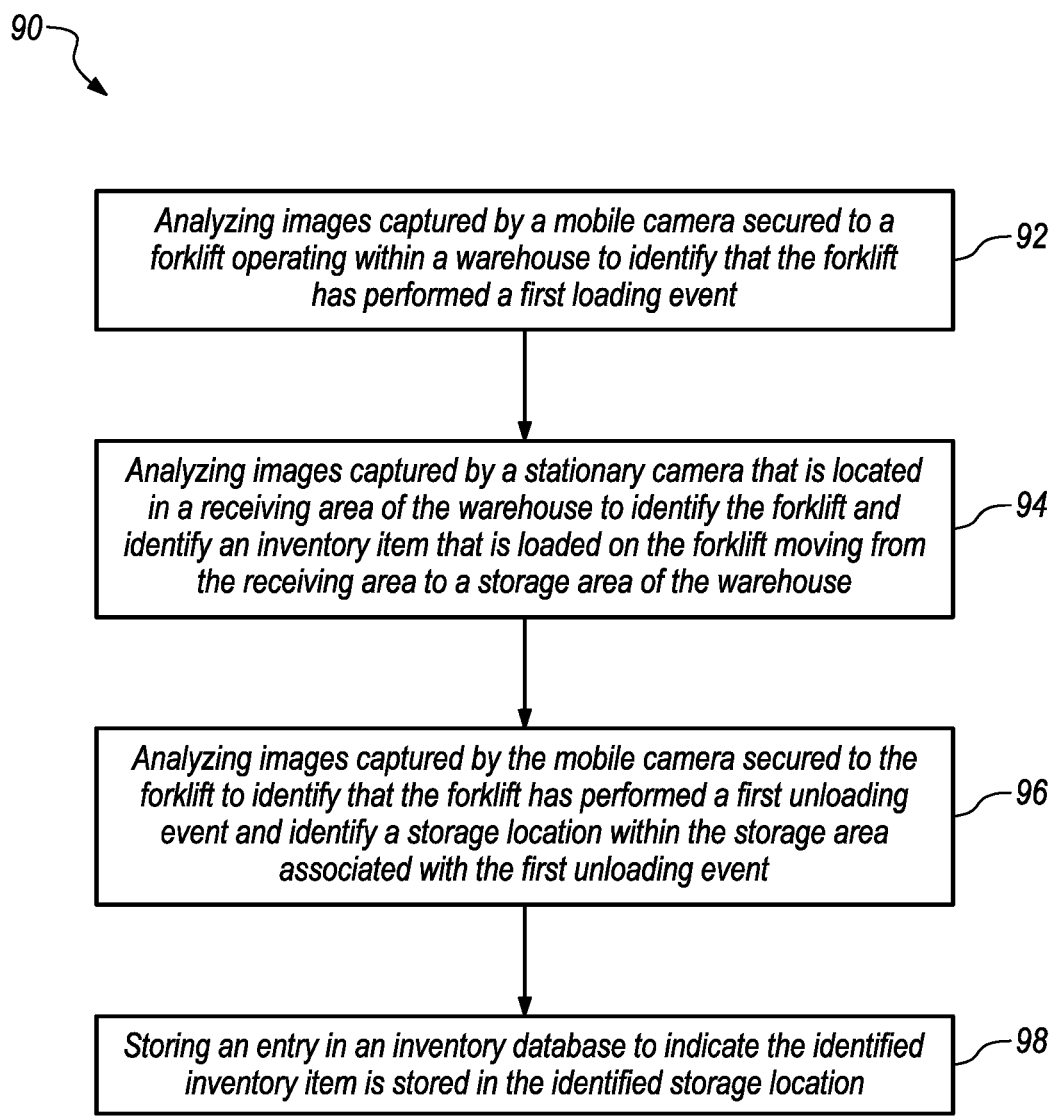
FIG. 8 is flowchart of operations in accordance with some embodiments.

FIG. 8 is flowchart of operations 90 in accordance with some embodiments. Operation 92 includes analyzing images captured by a mobile camera secured to a forklift operating within a warehouse to identify that the forklift has performed a first loading event. Operation 94 includes analyzing images captured by a stationary camera that is located in a receiving area of the warehouse to identify the forklift and identify an inventory item that is loaded on the forklift moving from the receiving area to a storage area of the warehouse. Operation 96 includes analyzing images captured by the mobile camera secured to the forklift to identify that the forklift has performed a first unloading event and identify a storage location within the storage area associated with the first unloading event. Operation 98 includes storing an entry in an inventory database to indicate the identified inventory item is stored in the identified storage location.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to cause the processor to perform operations comprising:
    analyzing images captured by a mobile camera secured to a forklift operating within a warehouse to identify that the forklift has performed a first loading event;
    analyzing images captured by a stationary camera that is located in a receiving area of the warehouse to identify the forklift and identify an inventory item that is loaded on the forklift moving from the receiving area to a storage area of the warehouse;
    analyzing images captured by the mobile camera secured to the forklift to identify that the forklift has performed a first unloading event and identify a storage location within the storage area associated with the first unloading event; and
    storing an entry in an inventory database to indicate the identified inventory item is stored in the identified storage location.

2. The computer program product of claim 1, wherein analyzing images captured by a mobile camera secured to a forklift operating within a warehouse to identify that the forklift has performed a first loading event, includes analyzing images captured by a mobile camera secured to a forklift to determine that the forklift is moving and the inventory item is moving along with the forklift.

3. The computer program product of claim 1, wherein analyzing images captured by a mobile camera secured to a forklift operating within a warehouse to identify that the forklift has performed a first unloading event, includes analyzing images captured by a mobile camera secured to a forklift to determine that the forklift is moving and the inventory item is no longer moving along with the forklift.

4. The computer program product of claim 1, the operations further comprising:
    storing, in response to identifying the inventory item that is loaded on the forklift, a temporary association between the identified inventory item and the identified forklift.

5. The computer program product of claim 1, wherein analyzing input from a stationary camera that is located in a receiving area of a warehouse includes reading a barcode on the inventory item.

6. The computer program product of claim 5, wherein analyzing input from a stationary camera that is located in a receiving area of a warehouse includes reading a barcode on the forklift.

7. The computer program product of claim 1, wherein analyzing input from a stationary camera that is located in a receiving area of a warehouse includes analyzing input from a plurality of stationary cameras that are each located in the receiving area of the warehouse.

8. The computer program product of claim 1, wherein the storage location is identified by the mobile camera capturing an image of a location identifier displayed at the storage location in the view of the mobile camera at a time associated with the identified first unloading event.

9. The computer program product of claim 8, wherein the storage location identifier is a barcode.

10. The computer program product of claim 1, the operations further comprising:
    analyzing, in response to identifying the first loading event, images captured by the stationary camera that is located in the receiving area of the warehouse to determine that the identified forklift is currently located in the receiving area of the warehouse.

11. The computer program product of claim 1, the operations further comprising:
    analyzing images captured by the mobile camera secured to the forklift to identify that the forklift has performed a second loading event and identify the storage location within the warehouse associated with the second loading event; and
    analyzing images captured by a stationary camera that is located in a dispatching area of the warehouse to identify the forklift and identify the inventory item that is loaded on the forklift entering the dispatching area of the warehouse;
    analyzing images captured by the mobile camera secured to the forklift to identify that the forklift has performed a second unloading event; and
    updating the inventory database to indicate that the identified inventory item is no longer stored in the identified storage location.

12. The computer program product of claim 11, the operations further comprising:
    analyzing, in response to identifying the second unloading event, images captured by the stationary camera that is located in the dispatching area of the warehouse to determine that the identified forklift is currently located in the dispatching area of the warehouse.

13. The computer program product of claim 1, the operations further comprising:
    analyzing images captured by the mobile camera secured to the forklift to identify that the forklift has performed a second loading event and identify the storage location within the warehouse associated with the second loading event;
    analyzing images captured by a stationary camera that is located in a dispatching area of the warehouse to identify the forklift entering the dispatching area of the warehouse;
    analyzing images captured by the mobile camera secured to the forklift to identify that the forklift has performed a second unloading event; and
    updating the inventory database to indicate that the inventory item previously indicated to be stored in the identified storage location is no longer stored in the identified storage location.

14. The computer program product of claim 13, the operations further comprising:
    analyzing, in response to identifying the second unloading event, images captured by the stationary camera that is located in the dispatching area of the warehouse to determine that the identified forklift is currently located in the dispatching area of the warehouse.

15. A method, comprising:
    analyzing images captured by a mobile camera secured to a forklift operating within a warehouse to identify that the forklift has performed a first loading event;
    analyzing images captured by a stationary camera that is located in a receiving area of the warehouse to identify the forklift and identify an inventory item that is loaded on the forklift moving from the receiving area to a storage area of the warehouse;

analyzing images captured by the mobile camera secured to the forklift to identify that the forklift has performed a first unloading event and identify a storage location within the storage area associated with the first unloading event; and storing an entry in an inventory database to indicate the identified inventory item is stored in the identified storage location.

16. The method of claim 15, the operations further comprising:

storing, in response to identifying the inventory item that is loaded on the forklift, a temporary association between the identified inventory item and the identified forklift.

17. The method of claim 15, wherein analyzing input from a stationary camera that is located in a receiving area of a warehouse includes reading a barcode on the inventory item.

18. A system, comprising:

a wireless mobile camera for capturing images;

a stationary camera for capturing images;

a computing system including at least one non-volatile storage device storing program instructions, and at least one processor configured to process the program instructions, wherein the program instructions are configured to, when processed by the at least one processor, cause the computing system to perform operations comprising:

analyzing images captured by the wireless mobile camera secured to a forklift operating within a warehouse to identify that the forklift has performed a first loading event;

analyzing images captured by the stationary camera that is located in a receiving area of the warehouse to identify the forklift and identify an inventory item that is loaded on the forklift moving from the receiving area to a storage area of the warehouse;

analyzing images captured by the mobile camera secured to the forklift to identify that the forklift has performed a first unloading event and identify a storage location within the storage area associated with the first unloading event; and storing an entry in an inventory database to indicate the identified inventory item is stored in the identified storage location.

19. The system of claim 18, the operations further comprising:

storing, in response to identifying the inventory item that is loaded on the forklift, a temporary association between the identified inventory item and the identified forklift.

20. The system of claim 18, wherein analyzing input from a stationary camera that is located in a receiving area of a warehouse includes reading a barcode on the inventory item.

* * * * *